Nov. 20, 1962  R. P. FULLER  3,064,376
TRANSPARENCY VIEWER
Filed March 7, 1960  3 Sheets-Sheet 1

INVENTOR.
RICHARD P. FULLER
BY
Paul A. Weilein
ATTORNEY

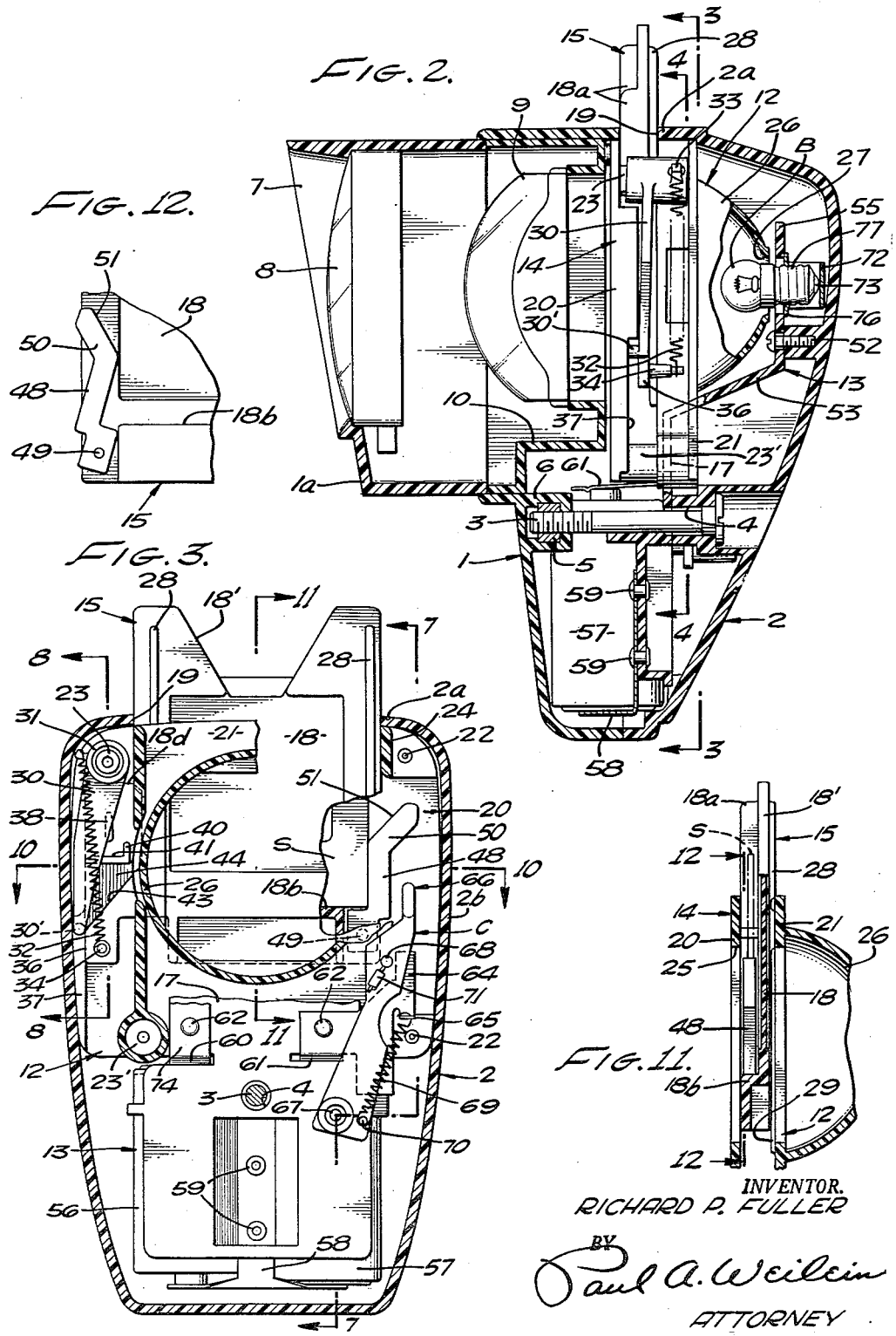

Nov. 20, 1962  R. P. FULLER  3,064,376
TRANSPARENCY VIEWER
Filed March 7, 1960  3 Sheets-Sheet 3

INVENTOR.
RICHARD P. FULLER
BY
Paul A. Weilein
ATTORNEY

United States Patent Office 3,064,376
Patented Nov. 20, 1962

3,064,376
TRANSPARENCY VIEWER
Richard P. Fuller, North Hollywood, Calif., assignor to Craftsmen's Guild, Hollywood, Calif., a partnership
Filed Mar. 7, 1960, Ser. No. 13,178
18 Claims. (Cl. 40—63)

This invention relates to transparency viewers.

It is an object of this invention to provide an improved viewer for photographic and similar transparencies in slide form, which is simple in construction and has comparatively few moving parts.

It is another object of this invention to provide a novel arrangement of elements whereby a carrier for a slide when manually moved inwardly from an extended loading position to a predetermined position and then released, will become latched in viewing position subject to release and return to loading position in response to a momentary manually effected inward movement of the carrier.

It is another object of this invention to provide a viewer of the character described which readily lends itself to efficient and inexpensive quantity production in that the majority of the elements thereof may be advantageously made of plastic material molded to desired shape without requiring numerous machining operations or employment of numerous separate parts entailing increased assembly costs.

Another object of this invention is to provide in a viewer such as described a novel form of an actuator for a circuit closer in an electrical circuit for an electric lamp, the actuator being mounted on the slide carrier so that it will be disposed in a position for operating the circuit closer to close and open the circuit only by contact with a slide in the carrier and upon movement of the carrier with the slide therein, into predetermined positions.

A further object is the provision of a viewer such as described in which the latching of the slide carrier in viewing position and release of the carrier and its return to loading position are achieved through the instrumentality of a novel form of latch means and simple spring means wherein the latch means includes but one movable latch member mounted on the guide means for the carrier for movement about different axes, in other words, for limited universal movement, under the force of spring means and in accordance with the action of cam means and a latch element fixed on the carrier to effect the releasable latching of the carrier in response to predetermined manual movements of the carrier.

It is a further object of this invention to provide a viewer such as described which is of novel unit construction subject to ready assembly and disassembly, the units being held assembled by a single readily removable fastening and the entire viewer being exceptionally compact and light as to weight whereby it conveniently may be held in one hand of the user.

Other objects and advantages of the invention will be hereinafter described or will become apparent to those skilled in the art, and the novel features of the invention will be defined in the appended claims.

Referring to the drawings:

FIG. 2 is a sectional view taken substantially on the line 2—2 of FIG. 1;

FIG. 3 is a sectional view taken substantially on the line 3—3 of FIG. 2, showing the carrier extended into loading position with a slide mounted on the carrier;

FIG. 11 is a sectional view taken on the line 11—11 of FIG. 3; and

FIG. 12 is a sectional view taken on the plane of line 12—12 of FIG. 11.

Figure 1:
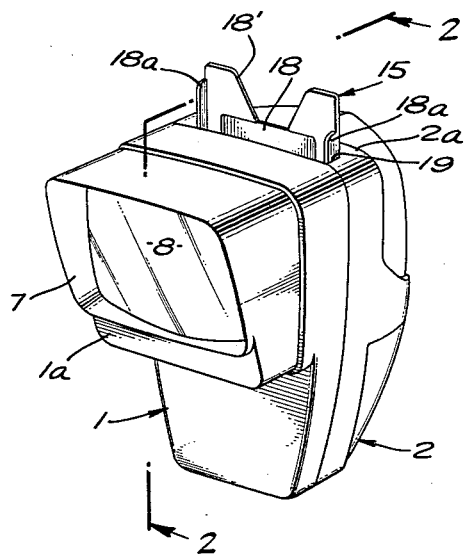
FIG. 1 is a perspective view of a transparency viewer embodying the present invention.
Figure 7:
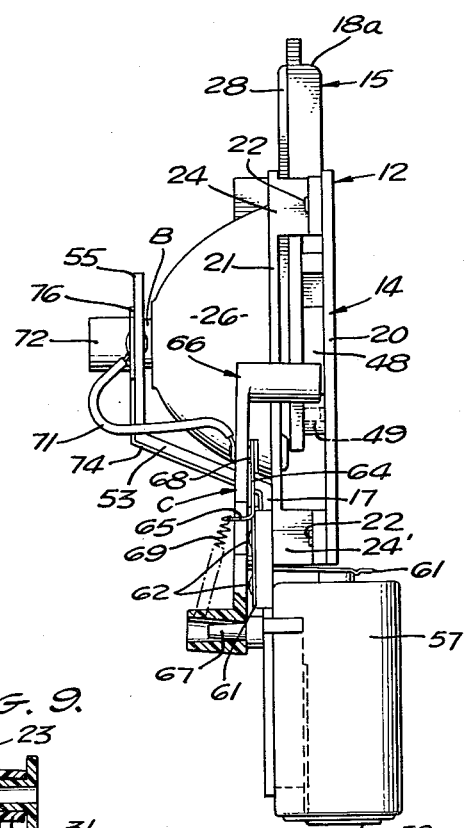
FIG. 7 is a detail view taken substantially on the line 7—7 of FIG. 3, showing the illuminating and slide carrier sub-assemblies with the outer case removed.

As shown in the accompanying drawings, a transparency viewer made in accordance with the present invention includes a housing preferably made of suitable plastic material and comprising a front section 1 and a rear section 2. These sections are detachably held in assembled relation by means of a screw 3 extended through an opening 4 in the rear section 2 so as to be threaded into a nut 5 embedded in a boss 6 interiorly of the front section 1.

The front section 1 is generally rectangular and has a forwardly extending portion 1a at its upper end provided with a viewing opening 7 and containing an optical system comprising lenses 8 and 9 positioned to effect the desired magnification of the image of a slide S when the latter is positioned in the housing so as to be visible through the viewing opening 7. The lens 8, as here shown, is fixed at the front end of housing extension 1a while the lens 9 is mounted in a frame 10 frictionally and removably held in the rear part of extension 1a.

The rear section 2 of the housing is generally rectangular and mounts therein two removable units, one being the slide carrier unit 12 and the other the electrical unit 13, which latter includes circuit elements and an electric light bulb B for illumination of the slide S in the carrier.

Figure 5:
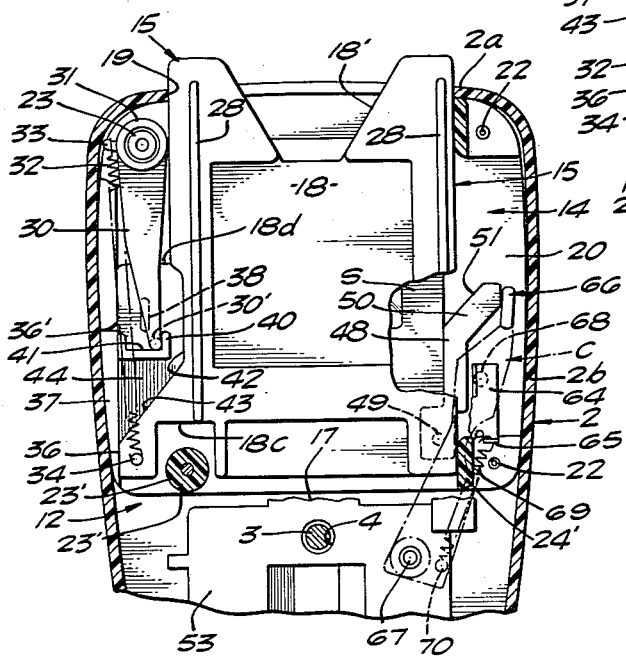
FIG. 5 is a sectional view corresponding to FIG. 4 showing the carrier latched in viewing position.

The slide carrier unit 12 includes a guide frame 14 for a slide carrier 15 slidably mounted therein for movement between the loading position shown in FIGS. 1, 2 and 3 and a viewing position shown in FIG. 5. As shown in FIG. 2, the frame 14 fits snugly in the upper front part of the rear housing section 2 with the rear side thereof abutting a portion 17 of the electrical unit 13 so as to maintain the carrier unit 12 in the desired position subject to ready removal and replacement when desired. The slide carrier 15 comprises a rectangular plate 18 having side flanges 18a and a bottom flange 18b which latter is adapted to support the slide S between the side flanges so as to maintain the slide in proper position on the carrier. The plate 18 is preferably made of a suitable translucent plastic material to serve as a light screen as well as a support for the slide S.

The end wall 2a of the housing section 2 is provided with an opening 19 through which the outer end of the carrier plate 18 extends from the housing so as normally to occupy the loading position shown in FIGS. 1, 2 and 3 whereby the slide S may be placed in the carrier and removed therefrom. The extended end of the carrier is provided with a notch 18' to faciltate placement and removal of the slide.

The frame 14 of the slide carrier unit 12 comprises a rectangular front plate 20 and a similar rear plate 21 joined to the front plate in opposed spaced relation thereto as by means of the fastenings 22 and the cylindrical spacing members 23 and 23' and the flanged spacing members 24 and 24' formed on the respective plates and disposed therebetween. The front plate 20 has a viewing opening 25 therein which aligns with the viewing opening 7 and lenses 8 and 9 in the front section 1 of the housing when the housing sections are assembled. The rear plate 21 is provided with a reflector 26 here shown as integral therewith and formed with a central opening 27 for reception of the light bulb B on the electrical unit 13.

Before the front and rear plates 20 and 21 are fastened together, the slide carrier 15 is mounted between the plates for movement between loading and viewing positions. Accordingly, cooperable guide flanges 28 and 29 on the plate 18 of the carrier 15 and rear plate 21 of the frame 14 respectively, form a guide track along which the carrier 15 is movable.

Novel means are provided for releasably latching the carrier 15 in viewing position and for returning the carrier to loading position incident to release of the carrier from viewing position. This means includes a simple spring unit and a single movable member other than the slide carrier 15. As here shown, the single movable member of the latching means includes a latch lever 30 pivoted on the frame 14 so as to swing in different directions into and from latching position incident to predetermined movement of the carrier.

Figure 8:
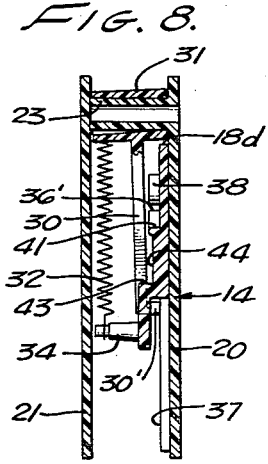
FIG. 8 is a fragmentary sectional view taken substantially on the line 8—8 of FIG. 3.
Figure 9:
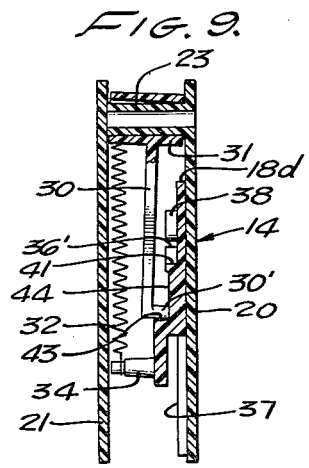
FIG. 9 is a view similar to FIG. 8, showing the latch lever in a different position than in FIG. 8.
Figure 10:
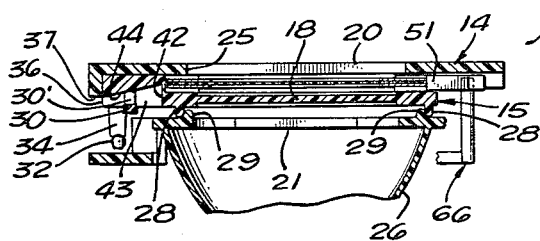
FIG. 10 is a fragmentary sectional view taken substantially on the line 10—10 of FIG. 3.

As shown in FIGS. 8 and 9, the pivotal mounting for the latch lever 30 comprises a sleeve 31 integral with one end of the latch lever and rotatably mounted on the spacing member 23. The bore of the sleeve 31 is of such greater diameter than that of member 23 as will permit the sleeve and lever to have limited rocking movement transversely of the plane in which the lever may oscillate about the axis of the pivotal mounting member 23. With this arrangement the free end of the lever 30 is capable of limited universal movement and this makes it possible to employ but one movable element in the latch means.

For the purpose of causing the latch lever 30 to move in this manner, a retractile spring 32 is fastened at one end to a lug 33 on one end portion of the sleeve 31 and at its other end to post 34 on the lower part of the plate 18 of the carrier 15. As will be seen in FIGS. 2, 8 and 9, the lever 30 is joined to the sleeve 31 at a point between the ends of the sleeve, whereby the spring 32 in being connected to an end of the sleeve, will at all times exert a force tending to swing the lever about the axis of the member 23 and to rock the sleeve and lever as about an axis substantially normal to the axis of member 23. In this connection it should be noted that the spring 32 also operates to return the carrier to loading position incident to release of the latch means.

Figure 4:
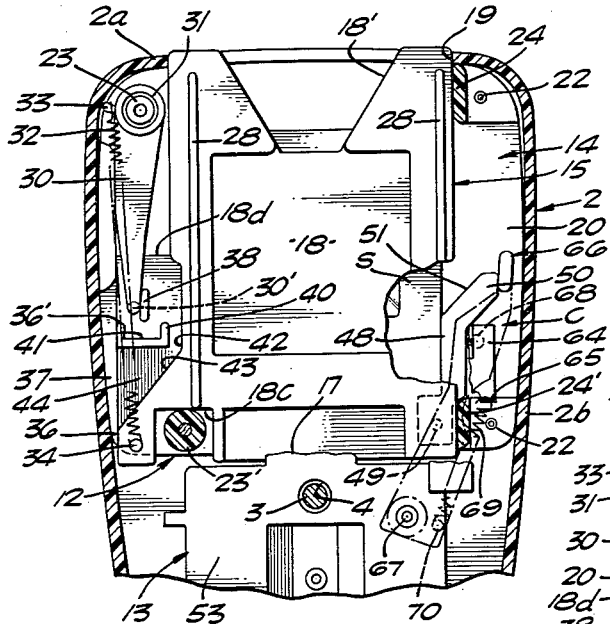
FIG. 4 is a fragmentary sectional view taken substantially on the line 4—4 of FIG. 2, showing the carrier fully inwardly extended and the latch means ready to latch the carrier upon release of manual pressure on the carrier.

The latch lever 30 is guided so as to move into position for latching the carrier 15 in viewing position upon movement of the carrier inwardly from the loading position shown in FIG. 3 to the position shown in FIG. 4, this being the limit of inward movement of the carrier since shoulder 18c on the carrier abuts the spacer member 23' to limit this movement of the carrier. Upon release of the carrier 15 following this inward movement, the spring 32 exerts a force moving the carrier outwardly a short distance from the position shown in FIG. 4 to the position shown in FIG. 5, so that the carrier will be latched in viewing position. Momentary inward depression of the carrier 15 from the position shown in FIG. 5 and release of the carrier, causes the latch lever 30 to release the carrier, whereupon the spring 32 returns the carrier to loading position shown in FIG. 3. A shoulder 18d on the carrier plate 18 contacts the sleeve 31 to limit outward movement of the carrier 15 to this loading position.

Cam means and stop members are provided on the carrier 15 for cooperation with the latch lever 30 in order that the carrier may be latched and released in the manner above noted. Accordingly, when the carrier is in its outwardly extended or loading position as shown in FIG. 3, a latch pin 30' on the outer end of the lever 30 rests upon a laterally offset side edge portion 36 of limited extent along a side edge of the carrier. At this time the outer end of the pin 30' abuts a surface 37 of the front plate 20 as seen in FIG. 2, the pin being urged against these two surfaces due to the spring 32 exerting forces on the sleeve 33 tending to move the lever 30 so that the pin 30' will move laterally against surface 37 (see FIG. 2) also inwardly against the edge portion 36 as shown in FIG. 3.

When it is desired to move the carrier 15 with a slide thereon into viewing position, the carrier is pushed inwardly from the position shown in FIG. 3 to the position shown in FIG. 4. During this movement of the carrier the latch pin 30' rides off of the end 36' of the edge portion 36 and then swings inwardly under the force of the spring 32 against a stop member 38 fixed on the carrier 15 as shown in FIG. 4.

Upon releasing manual pressure on the carrier after it is moved into the position shown in FIG. 4, the carrier is urged by the spring 32 outwardly to an extent that the pin 30' will move off the stop member 38 and then swing further inwardly against a latching stop member 40 and over a latch element 41, both of which are fixed on the carrier as shown in FIG. 5. In this position the pin 30' is held by the stop member 40 over the latch element 41, thereby preventing further outward movement of the carrier and releasably latching the carrier in viewing position.

Figure 6:
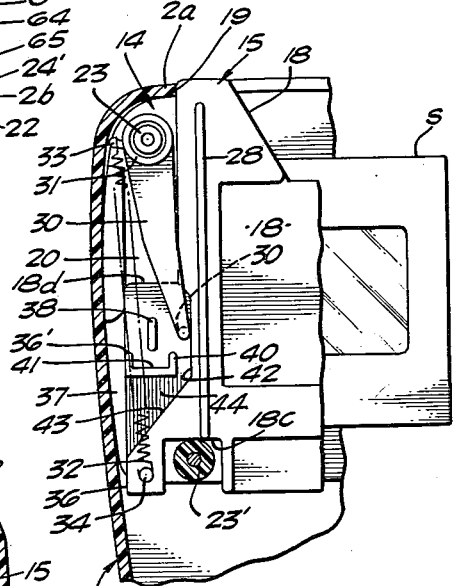
FIG. 6 is a sectional view corresponding to FIG. 5 but showing the carrier as when moved somewhat inwardly from position shown in FIG. 5 to release the latch means whereby the carrier will return to loading position incident to release of manual pressure on the carrier.

It is desired that the carrier 15 will be released from viewing position shown in FIG. 5 responsive to a slight momentary inward movement of the carrier whereby the spring 32 will return the carrier to loading position. For this purpose camming means are provided and will now be described. Accordingly, upon effecting this momentary inward movement of the carrier to release it from latched position the latch stop member 40 is moved inwardly away from the latch pin 30' which latter then swings with a snap action further inwardly to the position shown in FIG. 6, thereby releasing the carrier. The spring 32 now moves the carrier outwardly and the pin 30' moves along a short straight guiding surface 42 formed on the carrier and which acts as a stop when the pin moves clear of the stop member 40. The guiding surface 42 guides the pin 30' onto a cam surface 43 so inclined on the carrier as to cause the pin 30' to move outwardly toward the edge portion 36 of the carrier as the carrier continues to move toward loading position. During this movement of the pin 30' on the inclined cam surface 43, the outer end of the pin rides on a cam surface 44 which extends laterally from the inclined cam surface 43 and rises to merge with the edge portion 36 on the carrier. The cam surface 44 is inclined so that as the pin 30' rides outwardly thereon the lever 30 will be rocked on an axis normal to the axis of the supporting member 23 as it swings about the axis of this member. This rocking motion causes the pin 30' to be moved laterally between the frame plates 20 and 21 in a direction away from the front plate 20 as shown in FIG. 9, thereby placing the lever 30 including the sleeve 31 in such a position that when the pin 30' rides off the top of the inclined cam surface 44, the spring 32 will rock the lever laterally so that the pin will move laterally with a snap action onto edge portion 36, coincident with the movement of the carrier to loading position as shown in FIG. 3.

It should be noted that the pin 30' when moving along the edge portion 36, thence against the stops 38, 40 and 41, and finally down onto the straight surface 42 moves in substantially one plane between the plates 20 and 21 as the lever 30 swings about the axis of the member 23. However, when the pin 30' moves onto the inclined surface 43 and the outer end thereof engages the cam surface 44, the pin begins to shift transversely of the plane in which it formerly moved, that is, toward the back plate 21, so as to tilt the sleeve 31 and lever on the member 23 to a position whereby the spring 32 will be effective to move the lever and pin laterally toward the front plate and against the surface 37 and the edge portion 36 as in FIG. 3, when the pin rides to the outer ends of the cam surfaces 43 and 44.

The slide carrier unit 12 also includes novel actuating means for a circuit closer C in the circuit for the electric light bulb B. As shown in FIG. 3, this actuator means comprises an arm 48 having one end pivoted on a pin 49 carried by the plate 18 of the carrier 15 so that this arm may swing freely in opposite directions between opposed faces of the carrier plate 18 and the front plate 20 of the carrier guide frame 14. The upper end portion of the arm is extended angularly as at 50 so as to project normally out of the frame 14 and to provide a cam surface 51 on the side thereof opposed to the frame 14. The arm 48 is engageable with one end of the flange 18b on the carrier plate 18 to limit movement of the arm in a direction inwardly of the frame 14. The side wall 2b of the rear housing section 2 is engageable by the arm 48 to limit movement of the arm in a direction away from the frame 14. With these limiting stops the arm 48, regardless of the position in which the viewer is held, will be disposed in a position on the carrier such that when a slide S is mounted in the carrier the slide will engage the arm and move it into a position for actuating the circuit closer C when the carrier is moved and carries with it the arm 48 from the position shown in FIG. 3 to the position shown in FIGS. 4 and 5. The manner in which the arm actuates the circuit closer C will be fully described hereinafter in connection with the description of the electrical unit 13.

It should be noted that the slide carrier unit 12 including the frame 14, the carrier 15, the reflector 26 and all elements and parts carried by and formed integral with the carrier except the spring 32 and the fastenings 22, are preferably constructed of plastic material molded to the desired shape and to connect certain elements in integral relation with one another. This makes it possible to provide an extremely light-weight unit free from costly machining and numerous separate parts which would entail considerable costs in assembling operations.

The electrical unit 13 is detachably held in the rear housing section 2 by means of a single screw 52 as shown in FIG. 2, and includes a plastic base plate 53 mounted in the lower portion of the front of the section 2. The upper end portion 55 of the base plate is rearwardly offset and supports the electric light bulb B, this offsetting providing the space shown in FIG. 2 for accommodating the reflector which encompasses the light bulb B.

Provision is made for supporting flashlight batteries 56 and 57 on the base plate 53 so that the center terminal of battery 56 and the base terminal of battery 57 abut a resilient contact member 58 common to the two batteries and riveted as at 59 on the plate 53. Other resilient contact members 60 and 61 are secured by fastenings 62 on the plate 53 so that contact member 60 engages the base terminal of battery 56 while contact member 61 engages the center terminal of the battery 57. With this arrangement the contact members 58, 60 and 61 removably support the batteries therebetween and provide for a series connection of the batteries in the circuit for the electric bulb B.

The circuit closer C is operable to close the light bulb circuit only when a slide is positioned in the carrier 15 and the latter is pushed inwardly to viewing position. This circuit closer includes an extension of the contact member 61 disposed rearwardly of the base plate 53 and bent to form a stationary switch contact member 64. A movable switch contact member 64. A movable switch arm 66 is pivoted as at 67 on the rear side of the plate 53, being made of insulator material such as a suitable plastic so as to carry thereon the movable switch contact member 68 adapted to being moved into and out of engagement with the contact element 64 upon appropriate swinging movement of arm 66. As shown in FIG. 3, a spring 69 connected at its ends to an apertured ear 65 on the contact member 64 and to a lug 70 on the arm 66, biases the arm to circuit opening position. A flexible electrical conductor 71 is electrically connected at one end with the movable switch contact member 68 and electrically connected at its other end with a contact member 72 fixed on the back of the offset portion 55 of the base plate 53. The contact 72 is disposed to engage the center contact 73 of the bulb B. Another contact member 74 forming an extension of the contact member 60 leads therefrom along the back of the base plate 53 to a socket forming contact member 76 into which is screwed the base 77 of the light bulb B thereby completing the circuit for the bulb.

Summarizing the operation of the viewed, it is noted that when a slide S is positioned in the carrier 15 as indicated in FIGS. 2 and 3, the slide may be moved into viewing position by moving the carrier 15 inwardly. During this movement of the carrier 15, the latch pin 30' rides along the edge portion 36 of the carrier then off of the end portion 36' of the portion 36 and into engagement with the stop 38 when the lever swings inwardly by reason of the force of the spring 32, this being the position shown in FIG. 4. It should be noted that when the carrier is in the position shown in FIG. 4, the switch actuator arm 48 will have been moved inwardly with the carrier sufficiently to engage and rock the switch arm 66 into circuit closing position. This will cause the bulb B to illuminate the slide and render the same visible through the viewing opening although it is now necessary to remove manual pressure from the carrier in order that the carrier will become latched in viewing position. Incident to this release of manual pressure, the carrier will be moved outwardly a slight extent under the force of the spring 32, thereby moving the stop member 38 outwardly away from the latch pin 30' which latter then swings inwardly against the latch stop member 40 and over the latch member 41, thereby latching the carrier in viewing position as shown in FIG. 5.

Release of the carrier so that the spring 32 will be operative to return the carrier to loading position shown in FIGS. 2 and 3 may be effected at will by simply pressing inwardly momentarily on the outer end of the carrier. This inward movement of the carrier causes the latch stop member 40 to move inwardly away from the pin 30', which latter then swings further inwardly, thereby releasing the carrier. As the released latch pin 30' moves inwardly from latched position it encounters the guide surface 42, and as the carrier is moved outwardly toward loading position, the pin 30' will be guided onto the inclined surface 43 and in contact with the inclined cam surface 44 so that during the final movement of the carrier to loading position the lever is rocked so that the pin moves in a direction toward the back plate 21 as shown in FIG. 9, thereby canting the sleeve 31 so that when the latch pin 30' reaches the outer ends of the cam surfaces 43 and 44 it will move with a snap action toward the front plate 20 upon the edge portion 36 of the carrier and so remain, coincident with the return of the carrier in loading position as shown in FIG. 3.

It is important to note that the simplicity and efficiency of the latch means is brought about through the provision of novel means whereby the latch lever is permitted movement about different axes or in other words, has limited universal movement, and by reason of the construction of the cam surfaces and stop means as integral portions of the carrier. This arrangement eliminates the necessity of providing separate parts and the machining of such parts as well as the cost of assembly thereof.

While specific structural details have been shown and described, it should be understood that changes and alterations may be resorted to without departing from the spirit of the invention as defined in the appended claims.

I claim:

1. In a transparency viewer having a housing in which a slide carrier is movable on guide means between loading and viewing positions: the improvement wherein latch means are provided for releasably holding the carrier in viewing position; said latch means comprising a latch lever; means mounting said latch lever in said housing for movement into and from position latching said carrier in viewing position; a latch element on said carrier engageable with said lever for releasably latching the carrier in said viewing position; spring means operatively connected with said lever and said carrier for effecting movement of said lever into and from said latching position responsive to predetermined movement of said carrier; and cam means on said carrier operable to guide said lever into and from latching position.

2. In a transparency viewer having a housing in which a slide carrier is movable on guide means between loading and viewing positions: the improvement wherein latch means are provided for releasably holding the carrier in viewing position; said latch means comprising a latch lever; means mounting said latch lever in said housing for movement into and from position latching said carrier in viewing position; a latch element on said carrier engageable with said lever for releasably latching the carrier in said viewing position; spring means; means operatively connecting said spring means with said lever and said carrier so that said spring means biases said carrier toward said loading position and will move said lever into and from said latching position responsive to predetermined movement of said carrier; and cam means on said carrier operable to guide said lever into and from latching position.

3. In a transparency viewer having a housing in which a slide carrier is movable on guide means between loading and viewing positions: the improvement wherein latch means are provided for releasably holding the carrier in viewing position; said latch means comprising a latch lever; a latch element fixed on said carrier; a sleeve mounted on said guide means for rotation about an axis; said lever projecting from said sleeve and being movable into and from latching engagement with said element to releasably hold the carrier in viewing position; spring means connected with said sleeve and said carrier operable to bias said carrier toward said loading position and operable to move said lever into and from latching position in response to predetermined movements of said carrier; and cam means on said carrier for guiding said latch lever into and from latching position.

4. In a transparency viewer having a housing in which a slide carrier is movable on guide means between loading and viewing positions: the improvement wherein latch means are provided for releasably holding the carrier in viewing position; said latch means comprising cooperable latch elements on said carrier and said guide means, respectively; spring means operatively connected with one of said latch elements and said carrier operable to urge said one element into and from latching engagement with the other of said elements upon predetermined movement of said carrier; and cam means engageable with said one element for guiding said one element into and from latching engagement with said other element in response to said movement of said carrier.

5. In a transparency viewer having a housing in which a slide carrier is movable on guide means between loading and viewing positions: the improvement wherein latch means are provided for releasably holding the carrier in viewing position; said latch means comprising cooperable latch elements on said carrier and said guide means, respectively; spring means; means operatively connecting said spring means with one of said latch elements and said carrier whereby said spring means is operable to urge said one element into and from latching engagement with the other of said elements upon predetermined movement of said carrier and to bias said carrier toward said loading position; and cam means engageable with said one element for guiding said one element into and from latching engagement with said other element in response to said movement of said carrier.

6. In a transparency viewer having a housing in which a slide carrier is movable on guide means between loading and viewing positions, and releasable latch means for holding said carrier in viewing position; the improvement wherein said releasable latch means includes: a latch member; means mounting said latch member on said guide means so that a portion of said latch member is capable of limited universal movement; stop means on said carrier engageable with said portion of said latch member to releasably latch the carrier in said viewing position in response to said limited universal movement of said portion; cam means on said carrier operable to guide said portion of said latch member; and spring means operatively connected with said carrier and said latch member operable in response to movement of said carrier on said guide means and the guiding action of said cam means to effect said universal movement of said portion of said latch member into and from latching engagement with said stop means.

7. In a transparency viewer having a housing in which a slide carrier is movable on guide means between loading and viewing positions, and releasable latch means for holding said carrier in viewing position; the improvement wherein releasable latch means includes: a latch member; means mounting said latch member on said guide means so that a portion of said latch member is capable of limited universal movement; stop means on said carrier engageable with said portion of said latch member to releasably latch the carrier in said viewing position in response to said limited universal movement of said portion; cam means on said carrier operable to guide said portion of said latch member; spring means operatively connected with said latch member operable in response to movement of said carrier on said guide means and the guiding action of said cam means to effect said universal movement of said portion of said latch member into and from latching engagement with said stop means; and means connecting said spring means with said carrier for moving said carrier toward said loading position upon release of said carrier from said latched position.

8. In a transparency viewer having a housing in which a slide carrier is movable on guide means between loading and viewing positions, and releasable latch means for holding said carrier in viewing position; the improvement wherein releasable latch means includes: a latch member; means mounting said latch member on said guide means so that a portion of said latch member is capable of limited universal movement; stop means on said carrier engageable with said portion of said latch member to releasably latch the carrier in said viewing position in response to said limited universal movement of said portion; cam means on said carrier operable to guide said portion of said latch member; spring means; means operatively connected with said carrier and said latch member so that said spring means biases said carrier toward said loading position and is operable in response to movement of said carrier on said guide means and the guiding action of said cam means to effect said universal movement of said portion of said latch member into and from latching engagement with said stops means; and means embodied in said stop means and said latch means cooperable to release said carrier for return to said loading position in response to manually effected inward movement of the carrier from said viewing position.

9. In a transparency viewer having a housing in which a slide carrier is movable on guide means between loading and viewing positions, and releasable latch means for holding said carrier in viewing position; the improvement wherein releasable latch means includes: a latch member; means mounting said latch member on said guide means for swinging movement about a first axis as well as rocking movement about a second axis angularly related to said first axis; stop means on said carrier engageable with said latch member to releasably latch the carrier in said viewing position; cam means on said carrier operable to guide said latch member in said movements about said axes; and spring means operatively connected with said carrier and said latch member operable to bias said carrier toward said loading position as well as operable in response to predetermined manually effected movement of said carrier and said guiding action of said cam means to move said latch member about said axes into and from latching engagement with said stop means.

10. In a transparency viewer having a housing in which a slide carrier is movable on guide means between loading and viewing positions, and releasable latch means for holding said carrier in viewing position; the improvement wherein releasable latch means includes: a bearing sleeve; a latch lever projecting from said sleeve at a point axially spaced from an end of the sleeve; means on said guide means mounting said sleeve thereon for rotation about said axis and for rocking movement transversely of said axis; a latch element on said carrier engageable with said lever to latch and release said carrier in response to predetermined movements of said carrier; cam means on said carrier for guiding said latch lever; and spring means connected to said sleeve to one side of said lever operable to rotate said sleeve about said axis and to rock said sleeve transversely of said axis to effect said movement of said lever in cooperation with said cam means.

11. In a transparency viewer having a housing in which a slide carrier is movable on guide means between loading and viewing positions and wherein illuminating means for the slide includes an electrical circuit and a circuit closer; the improvement which includes: an actuator member; and means pivoting said actuator member on said carrier for limited swinging movement into and from a position for contacting and operating said circuit closer; said actuator member being disposed on said carrier so that it will be engaged and held in a position by a slide in the carrier to operate the circuit closer upon movement of said carrier into and from said viewing position.

12. In a transparency viewer having a housing in which a slide carrier is movable on guide means between loading and viewing positions and wherein illuminating means for the slide includes an electrical circuit and a circuit closer; the improvement which includes: an actuator member; and means mounting said actuator member on said carrier for movement into and from a position for contacting and operating said circuit closer; said actuator member being disposed on said carrier so that it will be engaged and held in a position by a slide in the carrier to operate the circuit closer upon movement of said carrier into and from said viewing position; said actuator member maintaining said circuit closer in circuit closing position while said carrier is in said viewing position.

13. In a transparency viewing having a housing in which a slide carrier is movable on guide means between loading and viewing positions and wherein illuminating means for the slide includes an electrical circuit and a circuit closer; the improvement which includes: an actuator member; means pivoting said actuator member on said carrier for limited swinging movement into and from a position for contacting and operating said circuit closer; said actuator member being disposed on said carrier so that it will be engaged and held in a position by a slide in the carrier to operate the circuit closer upon movement of said carrier into and from said viewing position; and latch means operable to latch said carrier in viewing position and operable to release said carrier upon inward movement of the carrier from said viewing position.

14. In a transparency viewer having a housing in which a slide carrier is movable on guide means between loading and viewing positions and wherein illuminating means for the slide includes an electrical circuit and a circuit closer; the improvement which includes: an actuator member; means pivoting said actuator member on said carrier for limited swinging movement into and from a position for contacting and operating said circuit closer; said actuator member being disposed on said carrier so that it will be engaged and held in a position by a slide in the carrier to operate the circuit closer to close said circuit upon movement of said carrier into said viewing position; latch means operable to latch said carrier in viewing position and operable to release said carrier upon inward movement of the carrier from said viewing position; and means for operating said circuit closer to open said circuit upon movement of said carrier toward said loading position.

15. A slide viewer comprising a body having therein a slide opening and a viewing opening; a slide guide leading from said slide opening to said viewing opening; a slide carrier shiftably disposed in said guide and movable from a slide receiving position to a slide viewing position with the slide visually aligned with said viewing opening, and means for releasably latching said slide carrier in said slide viewing position; said latch mean including cooperative parts on said slide guide and on said slide carrier; one of said parts having a latch element shiftably projecting towards the other part; means urging said element towards said other part; said other part having a stop engageable by said element upon movement of said slide carrier to said slide viewing position to latch the same in the latter position; and cam means for moving said element out of engagement with said stop upon movement of said slide carrier in said slide guide beyond said viewing position.

16. A slide supporting device comprising a guide frame having a slide carrier shiftably disposed thereon; said frame having a supporting member on one side; a latch lever; means supporting said lever at one end for universal movement on said supporting member; said slide carrier having a planar portion slidably engaged by the free end of said lever; means normally biasing said lever in an arc across said planar portion; said planar portion having an outstanding stop engageable by the free end of said lever when said slide carrier is in one position relative to said guide; means including a shoulder engageable by the free end of said lever for guiding said free end of said lever into engagement with said stop upon movement of said slide carrier from a second position to said one position; and means including an inclined ramp leading from said plane surface to said shoulder and engageable by the free end of said lever for returning said free end of said lever to a position engaged with said shoulder upon disengagement of the free end of the lever from said stop and return of said slide to said second position.

17. A slide supporting device comprising, a guide frame; a slide carrier shiftable in said guide frame and having an outstanding wall; a latch element carried by said guide frame and projecting into engagement with said wall; said wall having a stop projection; and means including a spring acting on said latch element and guide surfaces on said wall for effecting engagement of said stop projection by said latch element upon movement of said slide carrier from a first position to a second position and for disengaging said latch element from said stop projection to permit return of said slide carrier to said first position upon slight movement of said slide carrier beyond said second position.

18. A slide supporting device comprising a guide frame; a slide carrier shiftable in said carrier; said guide frame including front and rear walls one of which is provided with an opening through which a slide in said carrier is visible; a latch lever carried by said frame; latch means engageable by said lever upon movement of said slide from a first position to a second position; and a second lever pivotally supported on said slide carrier and slidably disposed between said walls of said frame; said second lever having an edge engageable by a slide in said carrier to limit inward movement of said second lever between said side walls; and an actuator portion on the free end of said second lever and projectable laterally of said frame when said edge portion of said second lever is engaged by a slide.

References Cited in the file of this patent

UNITED STATES PATENTS

| | | |
|---|---|---|
| 2,604,814 | Smith | July 29, 1952 |
| 2,720,045 | Miller | Oct. 11, 1955 |
| 2,892,274 | Afton | June 30, 1959 |